(12) United States Patent
Yamamoto

(10) Patent No.: US 6,480,340 B1
(45) Date of Patent: Nov. 12, 2002

(54) ZOOM LENS

(75) Inventor: Chikara Yamamoto, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/597,897

(22) Filed: Jun. 19, 2000

(30) Foreign Application Priority Data

Jun. 17, 1999 (JP) ............................................. 11-170794

(51) Int. Cl.$^7$ ............................................... G02B 15/14
(52) U.S. Cl. ......................... 359/676; 359/680; 359/683
(58) Field of Search ................................ 359/676, 683, 359/679–682, 649

(56) References Cited

U.S. PATENT DOCUMENTS 5,668,668 A * 9/1997 Shibayama et al. .......... 359/683
6,137,638 A * 10/2000 Yamagishi et al. .......... 359/682

FOREIGN PATENT DOCUMENTS

| JP | 2516522 | | 4/1996 |
| JP | 10-186235 | * | 7/1998 |
| JP | 10-268193 | | 10/1998 |

* cited by examiner

Primary Examiner—Jordan M. Schwartz
(74) Attorney, Agent, or Firm—Young & Thompson

(57) ABSTRACT

A zoom lens comprises five lens groups including second, third and fourth lens groups which are moved in a given relationship relative to one another and relative to first and fifth lens groups which are stationary during zooming to continuously change the focal length and compensate a shift of image plane of the zoom lens such that the second and third lens groups move closer to each other as the zoom lens changes the focal length to the telephoto end satisfies at least the following conditions:

$$-1.7 < F_1/F < -0.3$$

$$0.7 < F_2/F < 2.2$$

$$1.5 \leq F_5/F < 2.2$$

where

F is the overall focal length of the zoom lens at a wide angle end;

$F_1$ is the focal length of the first lens group;

$F_2$ is the focal length of the second lens group;

$F_5$ is the focal length of the fifth lens group.

8 Claims, 17 Drawing Sheets

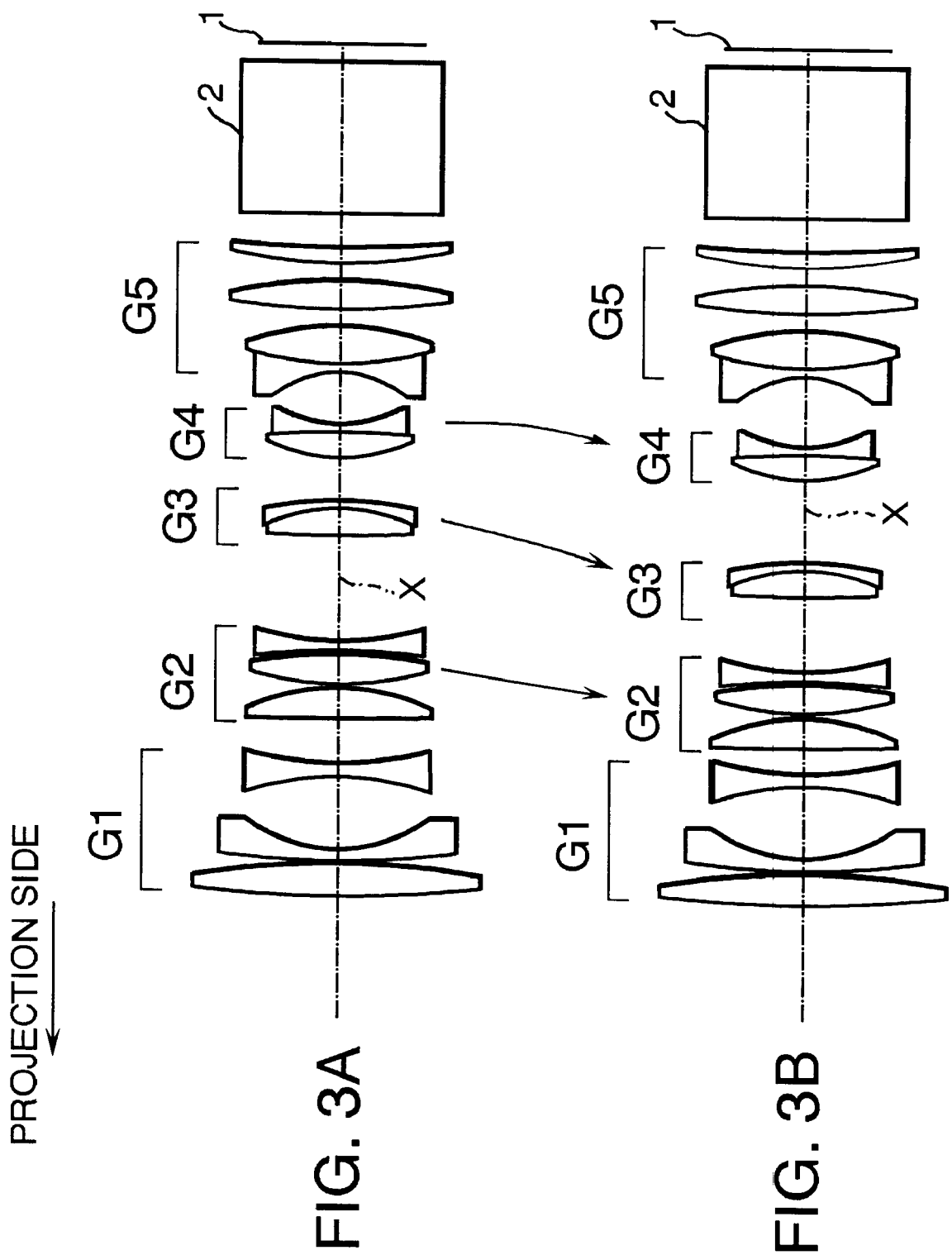

WIDE-ANGLE END

FIG. 6B

MIDDLE

F/1.93 — SPHERICAL ABERRATION (-0.01 to 0.01)

ω = 23.1° — ASTIGMATISM (-0.01 to 0.01)

ω = 23.1° — DISTORTION (-3% to 3%)

ω = 23.1° — LONGITUDINAL CHROMATIC ABERRATION (-0.001 to 0.001)

FIG. 6C
TELEPHOTO END
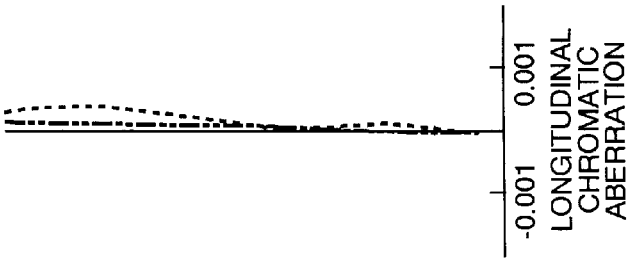
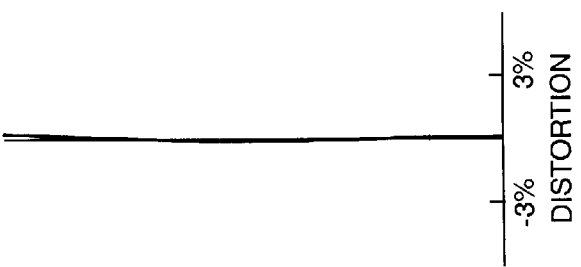
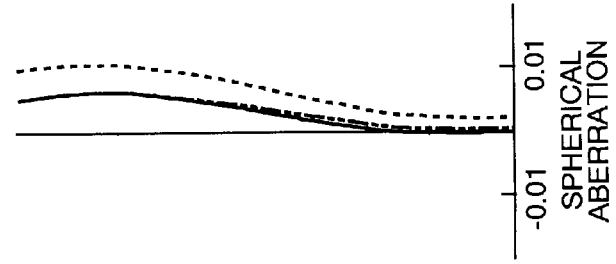

FIG. 7A
WIDE-ANGLE END

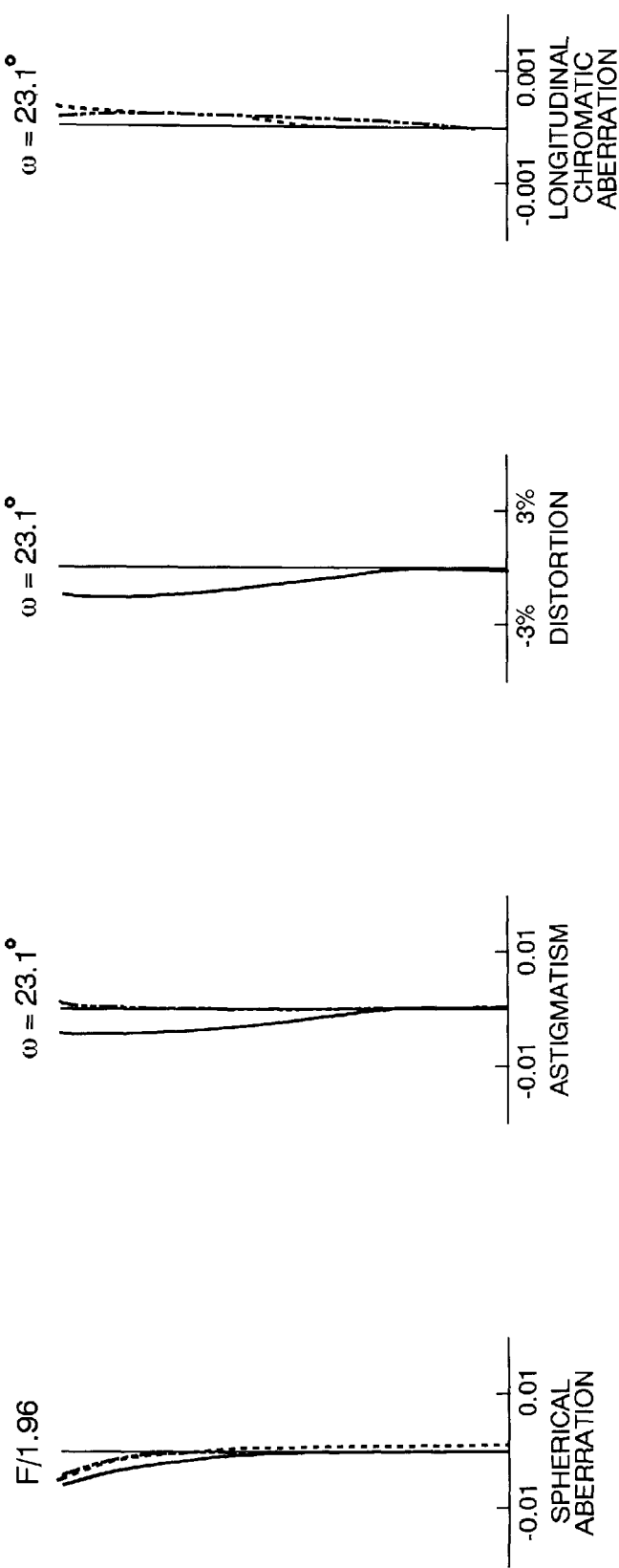
FIG. 7B MIDDLE

FIG. 7C
TELEPHOTO END
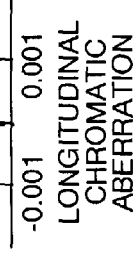
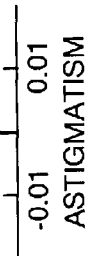
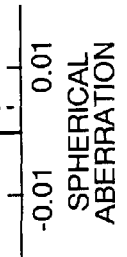

WIDE-ANGLE END

FIG. 8B
MIDDLE
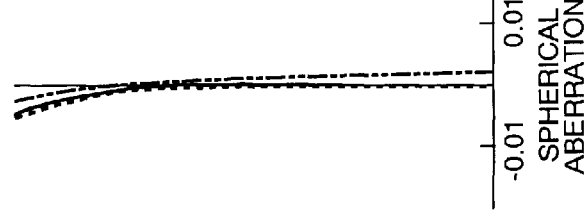

FIG. 8C

TELEPHOTO END

ω = 20.6°
−0.001  0.001
LONGITUDINAL CHROMATIC ABERRATION

ω = 20.6°
−3%  3%
DISTORTION

ω = 20.6°
−0.01  0.01
ASTIGMATISM

F/2.13
−0.01  0.01
SPHERICAL ABERRATION

WIDE-ANGLE END

FIG. 9B
MIDDLE
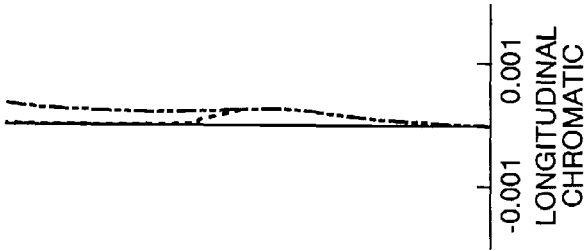

FIG. 9C

TELEPHOTO END

| F/2.01 | ω = 21.0° | ω = 21.0° | ω = 21.0° |
|---|---|---|---|
| SPHERICAL ABERRATION (-0.01 to 0.01) | ASTIGMATISM (-0.01 to 0.01) | DISTORTION (-3% to 3%) | LONGITUDINAL CHROMATIC ABERRATION (-0.001 to 0.001) |

ZOOM LENS

BACKGROUND OF THE INVENTION

1. Field of the Invention

The present invention relates to a zoom lens that is used, in particular, in an projection lens system for use with a projection type of television set equipped with a liquid crystal display device or as an image forming lens for use with cameras such as an electronic camera equipped with a CCD imaging device, an television camera equipped with a regular optical imaging device and an ordinary film camera.

2. Description Related to the Prior Art

Some of zoom lenses that comprise, in order from the projected image side to the master image side, a negative power first lens group which works as a focusing lens group movable during focusing but is stationary during zooming, a positive power second lens group which works as a zooming lens group, a negative power third lens group which compensates a positional shift of focal point or an image plane during zooming, and a positive power fourth lens group. One of such a zoom lens is known from, for example, Japanese Unexamined Patent Publication No. 5-297276, now patented as U.S. Pat. No. 2,516,522, entitled "wide Zoom Lens." This zoom lens has been designed with the intention to be incorporated to a small size of CCD imaging device. This wide zoom lens system must be large in its own size when used as it is together with an image forming device having a large image size, or this wide zoom lens system is still insufficient in correction of distortion when used as a projection lens. In particular, in the case of using the wide zoom lens in a projection lens system equipped with a liquid crystal display (LCD) device, although the projection zoom lens system is desirably designed to have teleccentricity on a master image side in consideration of illumination optical system, whereas, projection zoom lens systems have been designed without considering such telecentricity at all. Further, many projection zoom lenses have back-focal distances which are too short to permit a color composing optical element or a color separation optical element between the projection zoom lens and an image plane.

In order to eliminate such problems, Japanese Unexamined Patent Publication No. 10-268193 discloses a zoom lens comprising a negative power first lens group which works as a focusing lens group and is stationary during zooming, a positive power second lens element which is movable relative to the first lens group so as to vary a magnification continuously and compensate a positional shift of image plane due to the variation of magnification, a positive power third lens group, a negative power fourth lens group and a positive power fifth lens group which is stationary during zooming and satisfying specific given conditions.

In the recent years, there has been known projectors equipped with LCD elements each of which is provided with a micro lens for increasing an angle at which light emanates from the LCD element so as thereby to collect light effectively with an effect of securing brightness of an image on a projection screen. On the LCD element it is necessary to collect diffraction light effectively. For these reason, although there is a strong demand for a high speed zoom lens, the zoom lens disclosed in the above mentioned Japanese Unexamined Patent Publication No. 10-268193 has an F-number of approximately 2.5 and is consequently hardly capable of answering to the demand for high lens speed. Further, the zoom lens has been designed, though not quite satisfactorily, in consideration of application as a projection zoom lens equipped with a LCD device which I desirable to have telecentricity on the master image side and, however, does not meet a demand for compactness and inexpensiveness because the fifth lens group, which is stationary during zooming, increases its relative diameter when it has a focal point on the projected image side too close to that on the master image side.

SUMMARY OF THE INVENTION

It is an object of the present invention to provide a zoom lens that is approximately telecentric on an master image side and compact.

It is another object of the present invention to provide a zoom lens that is well corrected in various aberrations and has a long back-focal distance.

It is still another object of the present invention to provide a zoom lens that distributes light rays parallel to and symmetrical with respect to an optical axis thereof in a tangential plane on an master image side and has a sufficient lens speed while having a wide angle of view.

The above objects of the present invention are achieved by a zoom lens which comprises in order from the projected image side to the master image side a negative power first lens group which is movable as a focusing lens group and remains stationary during zooming, a positive power second lens group, a positive power third lens group, a negative power fourth lens group and a positive power fifth lens group which remains stationary during zooming, said second, third, and fourth lens groups being movable relatively to one another to vary a magnification of the zoom lens continuously and compensate a positional shift of an image plane of the zoom lens due to a variation of the magnification, and satisfies the following conditions (1) to (3):

$$-1.7 < F_1/F < -0.3 \tag{1}$$

$$0.7 < F_2/F < 2.2 \tag{2}$$

$$1.5 \leq F_5/F < 2.2 \tag{3}$$

where

F is the overall focal length of the zoom lens at a wide angle end;

$F_1$ is the focal length of the first lens group;

$F_2$2 is the focal length of the second lens group;

$F_5$ is the focal length of the fifth lens group.

The second lens group may comprise at least two positive power lens elements and is configured so as to shorten a distance relative to the third lens group as the zoom lens changes its focal length to the telephoto end.

Further, the zoom lens desirably satisfies the following conditions (4) and (5):

$$0.1 < D_2/F < 1.2 \tag{4}$$

$$0.05 < \delta D_2/(F_x F_t)^{1/2} < 0.6 \tag{5}$$

where $D_2$ is the axial distance between the second and the third lens group at a wide-angle end;

$\delta D_2$ is an absolute value of a change in the axial distance between the second and the third lens group between the wide-angle end and the telephoto end;

$F_t$ is the overall focal length of the zoom lens at the telephoto end.

The third lens group consists of two lens elements, namely a positive power lens element and a negative power lens element, cemented or separate, and satisfies the following condition (6)

$$\nu(-) < 35 \quad (6)$$

where $\nu(-)$ is the Abbe number of the negative lens element of the third lens group.

According to the zoom lens of the present invention, the second, third, and fourth lens groups are structured movable relatively to one another so as thereby to vary a magnification of the zoom lens continuously and compensate a positional shift of an image plane of the zoom lens that is caused due to the variation of magnification, which reduces a change in aberration for the zoom lens. When structuring the second and third lens groups so as to move close to each other as the zoom lens changes its focal length toward the telephoto end, the distance that the lens groups have to move for zooming can be shortened. Furthermore, aberrations are corrected for the zoom lens as a whole by employing more-than-two positive power lens elements for the second lens group, even when the zoom lens has a high speed, namely a small F-number. In the case where the zoom lens is telecentric on the master image side, if the fifth lens group, which remains stationary during zooming, has a focal point on the projected image side too close to that one the master image side, a lens element of the fifth lens group on the object end generally has to have a large diameter, which are always undesirable for compactness and inexpensiveness of the zoom lens.

As contrasted, while the zoom lens of the present invention that satisfies the conditions satisfactorily balances the correction of aberrations and the back-focal distance, the fifth lens group is designed and adapted to have a focal length within specified limits while balancing the correction of aberrations and the back-focal length for the zoom lens, so as thereby to locate the focal point of the fifth lens group on the projected image side not too close to the master image side.

The conditions (1) to (3) set forth provide a desired distribution of power and necessary for balancing the aberrations of the zoom lens. When the first lens group has an weak negative power exceeding the lower limit of the condition (1), the aberrations are hardly correctable for the zoom lens when it has a small F-number and/or a change in moving distance of the first lens group during focusing is increased, as a result of which increased aberration changes occur. On the other hand, when the first lens group has a strong negative power exceeding the upper limit of the condition (1), the paraxial light rays are leaped by the first lens group, which makes the correction of, in particular, distortion and spherical aberrations. When the second lens group has an weak positive power exceeding the upper limit of the condition (2), a change in moving distance of the second lens group during zooming is increased, which leads to an increased diameter of lens elements of the first lens group. On the other hand, when the second lens group has a strong positive power exceeding the lower limit of the condition (2), the aberrations are hardly correctable for the zoom lens. When the fifth lens group has a strong positive power exceeding the lower limit of the condition (3), the back-focal distance of the zoom lens is shortened so as to be hard to provide the zoom lens telecentricity on the master image side. Besides, the fifth lens group has to have the focal point on the projected image side that is too close to the master image side, which leads to an increased diameter of lens elements on the projected image side of the zoom lens.

On the other hand, when the fifth lens group has a weak positive power exceeding the upper limit of the condition (3), the back-focal distance is too long with the result of increasing the overall length of the zoom lens including its flange-focal distance. Further, the distance of incidence of paraxial light rays is too short to correct the aberrations for the zoom lens.

The conditions (4) and (5) set forth provides the positional relationship between the second and third lens groups in order to maintain a compact zoom lens design. Satisfaction of the condition (4) prevents or significantly reduces aggravation of the aberrations, in particular distortion, of the zoom lens. When the distance between the second and third lens group is so short to exceed the lower limit, it is difficult to balance distortion for the zoom lens. Besides, when the distance between the second and third lens group is too long exceeding the upper limit, it is difficult to maintain overall compactness of the zoom lens. When the upper limit of the condition (5) is exceeded, it is difficult to compensate a change in aberration which occurs due to zooming. On the other hand, the lower limit is exceeded, a relative movement of the second and third lens groups for zooming becomes large.

The condition (6) set forth is necessary for ensuring correction of chromatic aberrations. In particular, when the limit is exceeded, chromatic aberrations are hardly correctable.

BRIEF DESCRIPTION OF DRAWINGS

The above and other objects and features of the present invention will be more clearly understood from the following detailed description in connection with a preferred embodiment thereof when reading in conjunction with the accompanying drawings, in which:

FIG. 3 illustrates schematic side elevations of a zoom lens according to another embodiment of the present invention which is in the wide-angle end position and in the telephoto end position, respectively;

FIGS. 6A, 6B and 6C illustrates aberrations of the zoom lens shown in FIG. 1 in the wide-angle end position, the middle position and the telephoto end position, respectively;

FIGS. 7A, 7B and 7C illustrates aberrations of the zoom lens shown in FIG. 3 in the wide-angle end position, the middle position and the telephoto end position, respectively;

FIGS. 8A, 8B and 8C illustrates aberrations of the zoom lens shown in FIG. 4 in the wide-angle end position, the middle position and the telephoto end position, respectively; and FIGS. 9A, 9B and 9C illustrates aberrations of the zoom lens shown in FIG. 5 in the wide-angle end position, the middle position and the telephoto end position, respectively.

DETAILED DESCRIPTION OF THE INVENTION

In the following description, the term "projected image side" or "projection side" as used herein shall mean and refer to a large conjugate side on which an image is projected in the case where the zoom lens is used as a projection lens or on which a subject to be photographed is in the case where the zoom lens is used as an image taking or image pick-up lens, and the term "master image side" or "master side" as used herein shall mean and refer to a small conjugate side on which an master image to be projected is formed in the case where the zoom lens is used as a projection lens or on which an image is formed in the case where the zoom lens is used as an image taking or image pick-up lens.

In the following tables, various embodiments of the present invention are set forth with parameters of the invention. In the following prescription tables, the reference L followed by an arabic numeral indicates the lens element progressively from the projected image side of the zoom lens. The reference radius numbers R are the progressive lens surface radii. Positive surface radii are struck from the right of the lens surface on the optical axis. Negative surface radii are struck from the left of the lens surface on the optical axis. The reference distance numbers D are progressive axial distances between adjacent lens surfaces. The spaces D followed by an asterisk in parentheses are zoom spacing between lens groups which vary with a change in focal length of the zoom lens. Nd is the index of refraction of the lens elements. vd is the dispersion of the lens elements as measured by the Abbe number.

Figures 1A, 1B:
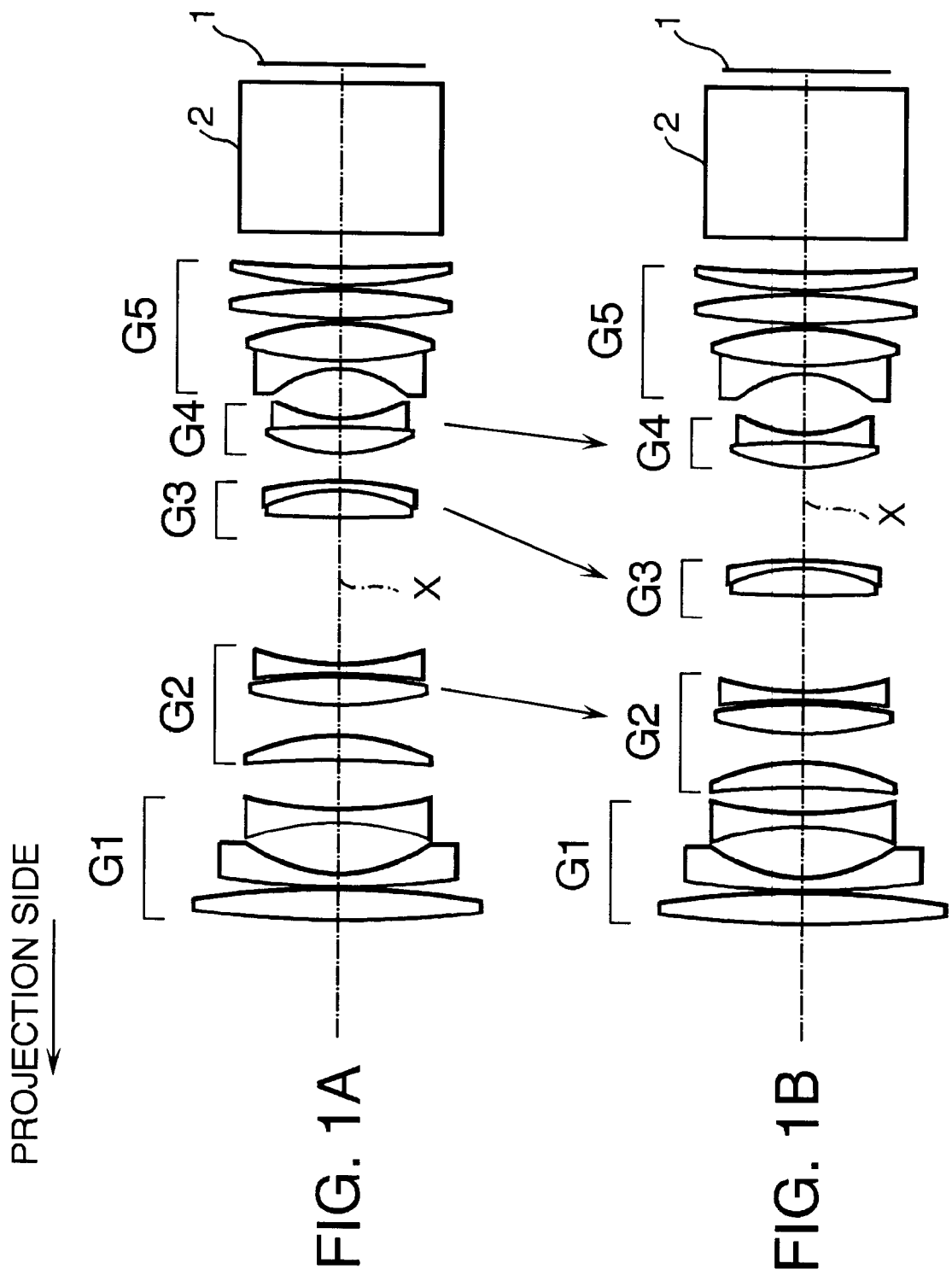
FIGS. 1A and 1B illustrates schematic side elevations of a zoom lens according to an embodiment of the present invention which is in the wide-angle end position and in the telephoto end position, respectively.
Figure 2:
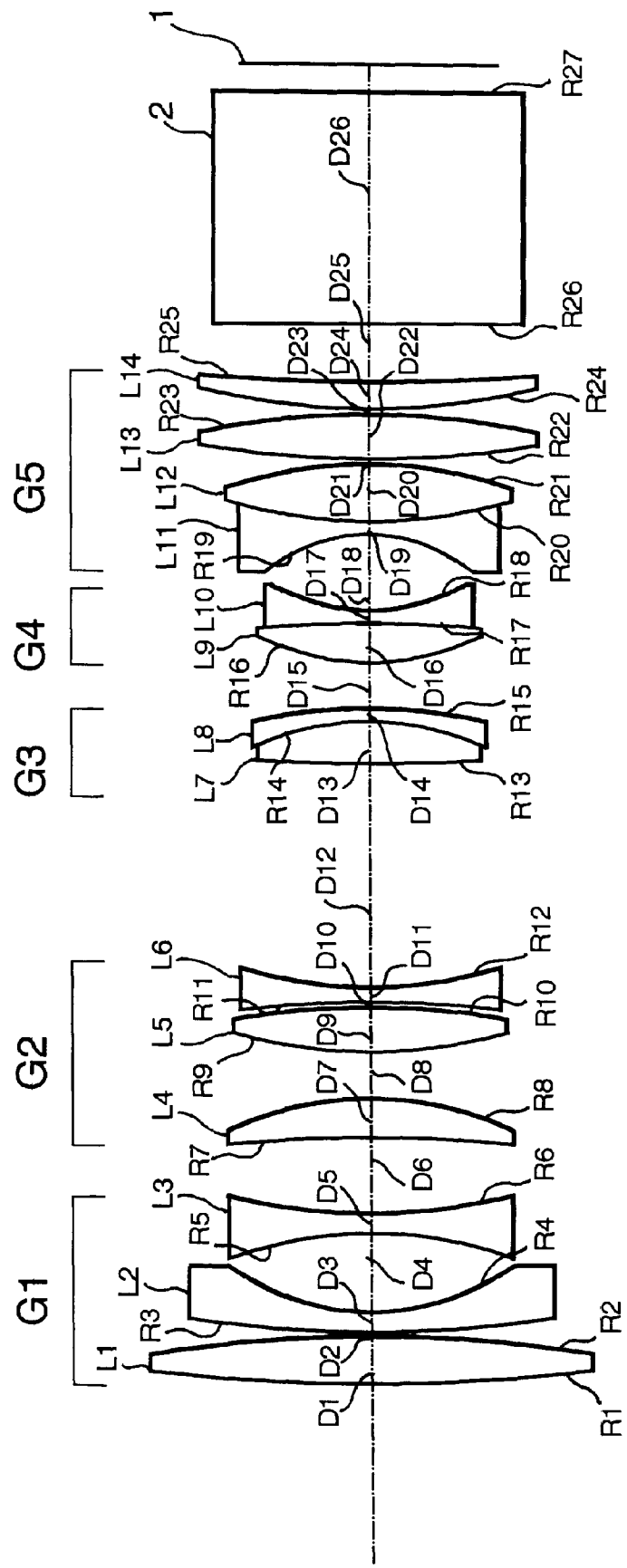
FIG. 2 illustrates a detailed side elevation of the zoom lens shown in FIG. 1 which is in the wide-angle end position.

A zoom lens used as a projection lens which embodies the present invention as exemplified in FIGS. 1A, 1B and 2 includes five lens groups, namely in order from the projected image side to the master image side a negative power first lens group G1, a positive power second lens group G2, a positive power third lens group G3, a positive power fourth lens group G4, and a positive power fifth lens group G5 as a master lens group. The first lens group G1 is movable along the optical axis X during focusing and, however, stationary during varying the focal length of the entire lens. The three groups, G2, G3 and G4 are moved along the optical axis X relative to one another and relative to the stationary lens groups G1 and G5 to vary a magnification continuously and compensate a positional shift of an image plane 1 that is caused due to the variation of magnification. There is provided between the zoom lens and the image plane 1 an optical element assembly 2 including an infrared cut filter, a low-pass filter and a color and a color composing optical element or a color separation optical element.

More specifically, the negative power first lens group G1 comprises in order from the projected image side to the master image side a positive power bi-convex first lens element L1 having a stronger curvature at the projected image side surface, a negative power meniscus second lens element L2 convex to the projected image side and a negative power bi-concave third lens element L3 having a stronger curvature at the projection side surface. The positive power second lens group G2 comprises in order from the projected image side to the master image side a positive power meniscus fourth lens element L4 convex to the master image side, a positive power bi-convex fifth lens element L5 having a stronger curvature at the projection side surface and a negative power bi-concave sixth lens element L6 having a stronger curvature at the projection side surface. The positive power third lens group G3 comprises in order from the projected image side to the master image side a positive power bi-convex seventh lens element L7 having a stronger curvature at the master side surface and a negative power meniscus eighth lens element L8 convex to the master image side. The negative power fourth lens group G4 comprises in order from the projected image side to the master image side a positive power bi-convex ninth lens element L9 having a stronger curvature at the projection side surface and a negative power bi-concave tenth lens element L10 having a stronger curvature at the master side surface. The positive power fifth lens group G5 comprises in order from the projected image side to the master image side a negative power bi-concave eleventh lens element L11 having a stronger curvature at the projection side surface, a positive power bi-convex twelfth lens element L12 having a stronger curvature at the master side surface, a positive power bi-convex thirteenth lens element L13 having a stronger curvature at the master side surface and a positive power meniscus fourteenth lens element L14 convex to the projected image side. The seventh and eighth lens elements L7 and L8, the ninth and tenth lens elements L9 and L10 and the eleventh and twelfth lens elements L11 and L12 are cemented, respectively.

The zoom lens shown in FIG. 1A and 1B is substantially described in Table I.

TABLE I

| Element | Radius of Curvature (mm) | Axial Distance Between Surfaces (mm) | Nd | vd |
|---|---|---|---|---|
| L1 | R1 = 4.4097 | D1 = 0.19098 | 1.51680 | 64.2 |
|  | R2 = −4.6434 | D2 = 0.00592 |  |  |
| L2 | R3 = 2.8912 | D3 = 0.05916 | 1.58913 | 61.1 |
|  | R4 = 0.8018 | D4 = 0.36650 |  |  |
| L3 | R5 = −1.0893 | D5 = 0.04733 | 1.54702 | 47.2 |
|  | R6 = 2.4663 | D6 (*) |  |  |
| L4 | R7 = −9.3255 | D7 = 0.13158 | 1.71301 | 53.9 |
|  | R8 = −1.4287 | D8 = 0.15167 |  |  |
| L5 | R9 = 1.6782 | D9 = 0.15382 | 1.83481 | 42.7 |
|  | R10 = −3.4423 | D10 = 0.01383 |  |  |
| L6 | R11 = −2.5424 | D11 = 0.04536 | 1.51823 | 58.9 |
|  | R12 = 2.7529 | D12 (*) |  |  |
| L7 | R13 = 6.3113 | D13 = 0.16004 | 1.80401 | 46.6 |
| L8 | R14 = −1.0677 | D14 = 0.03944 | 1.80519 | 25.4 |
|  | R15 = −2.5112 | D15 = (*) |  |  |
| L9 | R16 = 1.2142 | D16 = 0.13580 | 1.78591 | 44.2 |
| L10 | R17 = −3.7548 | D17 = 0.03353 | 1.64770 | 33.8 |
|  | R18 = 0.7641 | D18 = (*) |  |  |
| L11 | R19 = −0.7641 | D19 = 0.04141 | 1.84667 | 23.9 |
| L12 | R20 = 1.5141 | D20 = 0.25128 | 1.62041 | 60.3 |
|  | R21 = −1.0889 | D21 = 0.00671 |  |  |
| L13 | R22 = 3.0799 | D22 = 0.19114 | 1.84667 | 23.9 |
|  | R23 = −1.9771 | D23 = 0.00592 |  |  |

TABLE I-continued

| | | | | | |
|---|---|---|---|---|---|
| L14 | R24 = 2.5983 | D24 = 0.08118 | | 1.78591 | 44.2 |
| | R25 = 8.7038 | D25 = 0.20000 | | | |
| L15 | R26 = ∞ | D26 = 0.84408 | | 1.51633 | 64.1 |
| | R27 = ∞ | | | | |

Zooming Space

| | D6 | D12 | D15 | D18 |
|---|---|---|---|---|
| Wide-angle End | 0.29709 | 0.81786 | 0.16022 | 0.26147 |
| Middle | 0.20199 | 0.70037 | 0.36905 | 0.26522 |
| Telephoto End | 0.12441 | 0.55535 | 0.52579 | 0.33092 |

Parameters

| F1/F | F2/F | F5/F | D2/F | δD2/(F × Ft)½ | ν(−) |
|---|---|---|---|---|---|
| −0.95 | 1.29 | 1.74 | 0.82 | 0.23 | 25.4 |

As apparent from Table I, the zoom lens satisfies the following conditions (1) to (6):

$$-1.7 < F_1/F < -0.3 \quad (1)$$

$$0.7 < F_2/F < 2.2 \quad (2)$$

$$1.5 \leq F_5/F < 2.2 \quad (3)$$

$$0.1 < D_2/F < 1.2 \quad (4)$$

$$0.05 < \delta D_2/(F_x F_t)^{1/2} < 0.6 \quad (5)$$

$$\nu(-) < 35 \quad (6)$$

Further, as apparent, the zoom spacing between the second and third lens groups G2 and G3 becomes smaller as the zoom lens changes its focal length from the wide-angle end to the telephoto end, which realizes the overall compactness of the zoom lens.

Figure 6A:
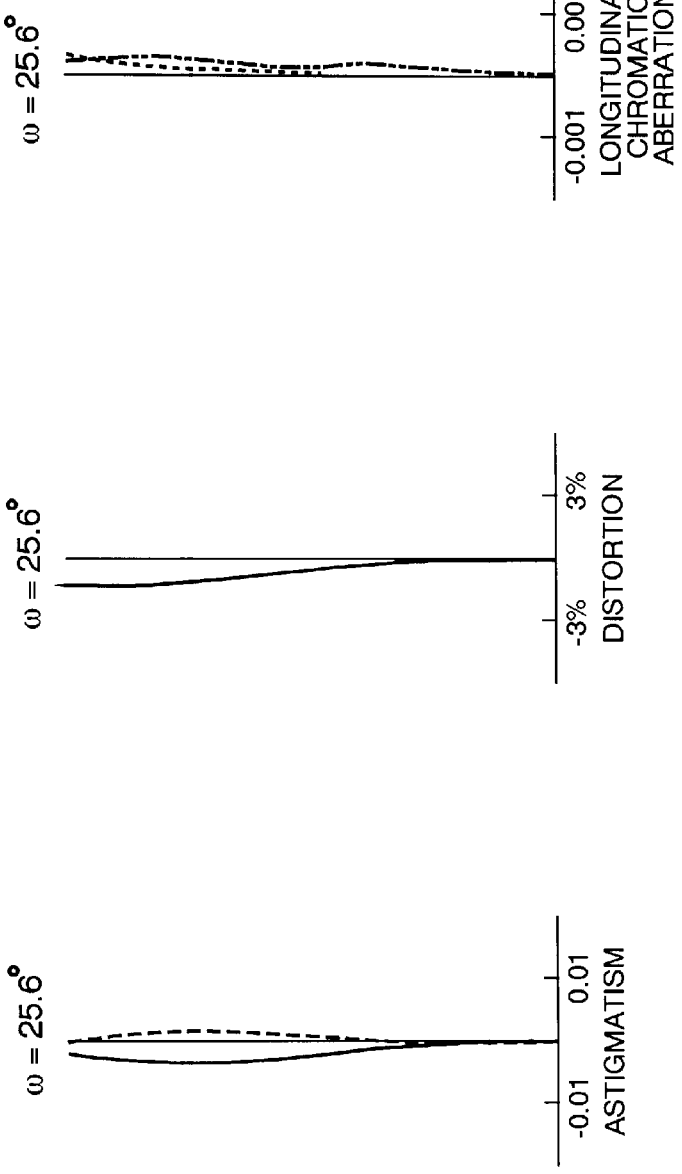

FIGS. 6A, 6B and 6C are diagrams showing curves of aberrations, namely spherical aberrations for d-, F- and C-spectral lines, astigmatism in the sagital plane and a tangential plane, distortion and the chromatic difference of magnification at the wide-angle end position, the middle position and the telephoto end position, respectively.

As apparent from Table I and the aberration diagrams, the zoom lens shown in FIGS. 1A and 1B the aberrations has the satisfactorily corrected aberrations as a whole over the range of zooming. Furthermore, the zoom lens is compact in structure for its image size and has an appropriately long back-focal distance. The zoom lens distributes light rays approximately parallel to and symmetrical with respect t to the optical axis X in a tangential plane on the master image side and has a high lens speed such as an F-number of 1.74 at the wide-angle end position. The fifth lens group G5 is such as to have its focal length within specified limits and, in consequence, has the focal point on the projected image side that is not too close to the master image side. The zoom lens has a conjugate length of 79.78 mm.

A zoom lens used as a projection lens according to another embodiment of the present invention shown in FIGS. 3A and 3B includes five lens groups G1–G5, 14 lens elements L1–L14. Specifically, the zoom lens includes in order from the projected image side to the master image side a negative power first lens group G1 which comprises in order from the projected image side to the master image side a positive power bi-convex first lens element L1 having a stronger curvature at the projection side surface, a negative power meniscus second lens element L2 convex to the projected image side and a negative power bi-concave third lens element L3 having a stronger curvature at the projection side surface, a positive power second lens group G2 which comprises in order from the projected image side to the master image side a positive power bi-convex fourth lens element L4 having a stronger curvature at the master side surface, a positive power bi-convex fifth lens element L5 having a stronger curvature at the projection side surface and a negative power bi-concave sixth lens element L6 having a stronger curvature at the projection side surface, a positive power third lens group G3 which comprises in order from the projected image side to the master image side a positive power bi-convex seventh lens element L7 having a stronger curvature at the master side surface and a negative power meniscus eighth lens element L8 convex to the master image side, a negative power fourth lens group G4 which comprises in order from the projected image side to the master image side a positive power bi-convex ninth lens element L9 having a stronger curvature at the projection side surface and a negative power bi-concave tenth lens element L10 having a stronger curvature at the master side surface, and a positive power fifth lens group G5 which comprises in order from the projected image side to the master image side a negative power bi-concave eleventh lens element L11 having a stronger curvature at the projection side surface, a positive power bi-convex twelfth lens element L12 having a stronger curvature at the master side surface, a positive power bi-convex thirteenth lens element L13 having a stronger curvature at the master side surface and a positive power by-convex fourteenth lens element L14 having a stronger curvature at the projection side surface. The seventh and eighth lens elements L7 and L8, the ninth and tenth lens elements L9 and L10 and the eleventh and twelfth lens elements L11 and L12 are cemented, respectively. The first lens group G1 is movable along the optical axis X during focusing and, however, stationary during varying the focal length of the entire lens. The three lens groups, G2, G3 and G4m are moved along the optical axis X relative to one another and relative to the stationary lens groups G1 and G5 to vary a magnification continuously and compensate a positional shift of an image plane 1 that is caused due to the variation of magnification. There is provided between the zoom lens and the image plane 1 an optical element assembly 2 including an infrared cut filter, a low-pass filter and a color and a color composing optical element or a color separation optical element.

The zoom lens shown in FIG. 3A and 3B is substantially described in Table II.

TABLE II

| Element | Radius of Curvature (mm) | Axial Distance Between Surfaces (mm) | Nd | νd |
|---|---|---|---|---|
| L1 | R1 = 6.1993 | D1 = 0.18389 | 1.51680 | 64.2 |
| | R2 = −4.2041 | D2 = 0.02931 | | |
| L2 | R3 = 4.2364 | D3 = 0.05909 | 1.58913 | 61.1 |
| | R4 = 0.8228 | D4 = 0.50953 | | |
| L3 | R5 = −0.9007 | D5 = 0.04727 | 1.54702 | 47.2 |
| | R6 = 2.1948 | D6 (*) | | |
| | R7 = 9.0165 | | | |

TABLE II-continued

| | | | | |
|---|---|---|---|---|
| L4 | | D7 = 0.17668 | 1.71301 | 53.9 |
| | R8 = −1.3980 | D8 = 0.00590 | | |
| | R9 = 1.7331 | | | |
| L5 | | D9 = 0.17145 | 1.83482 | 42.7 |
| | R10 = −3.3870 | D10 = 0.00951 | | |
| | R11 = −2.8306 | | | |
| L6 | | D11 = 0.04530 | 1.51823 | 58.9 |
| | R12 = 3.4714 | D12 = (*) | | |
| | R13 = 8.4992 | | | |
| L7 | | D13 = 0.14272 | 1.80401 | 46.6 |
| | R14 = −1.1282 | | | |
| L8 | | D14 = 0.03939 | 1.80519 | 25.4 |
| | R15 = −2.8027 | D15 = (*) | | |
| | R16 = 1.3338 | | | |
| L9 | | D16 = 0.11136 | 1.785914 | 44.2 |
| | R17 = −3.7548 | | | |
| L10 | | D17 = 0.03348 | 1.64770 | 33.8 |
| | R18 = 0.8701 | D18 = (*) | | |
| | R19 = −0.7419 | | | |
| L11 | | D19 = 0.04136 | 1.84667 | 23.9 |
| | R20 = 1.2421 | | | |
| L12 | | D20 = 0.21769 | 1.62041 | 60.3 |
| | R21 = −1.0570 | D21 = 0.13479 | | |
| | R22 = 3.1202 | | | |
| L13 | | D22 = 0.17028 | 1.84667 | 23.9 |
| | R23 = −2.3038 | D23 = 0.08462 | | |
| | R24 = 2.4306 | | | |
| L14 | | D24 = 0.11370 | 1.78591 | 44.2 |
| | R25 = −55.9712 | D25 = 0.15000 | | |
| | R26 = ∞ | | | |
| L15 | | D26 = 0.84229 | 1.51633 | 64.1 |
| | R27 = ∞ | | | |

| Zooming Space | | | | |
|---|---|---|---|---|
| | D6 | D12 | D15 | D18 |
| Wide-angle End | 0.24813 | 0.62723 | 0.25188 | 0.20833 |
| Middle | 0.18003 | 0.46595 | 0.43824 | 0.25065 |
| Telephoto End | 0.12543 | 0.28551 | 0.51793 | 0.40600 |

| Parameters | | | | | |
|---|---|---|---|---|---|
| F1/F | F2/F | F5/F | D2/F | δD2/(F × Ft)½ | ν(−) |
| −0.75 | 1.01 | 1.55 | 0.63 | 0.30 | 25.4 |

As apparent from Table II, the zoom lens shown in FIGS. 3A and 3B satisfies the conditions (1) through (6).

FIGS. 7A, 7B and 7C are diagrams showing curves of aberrations, namely spherical aberrations for d-, F- and C-spectral lines, astigmatism in the sagital plane and a tangential plane, distortion and the chromatic difference of magnification at the wide-angle end position, the middle position and the telephoto end position, respectively.

As apparent from Table II and the aberration diagrams shown in FIGS. 7A, 7B and 7C, the zoom lens shown in FIGS. 3A and 3B has the satisfactorily corrected aberrations as a whole over the range of zooming. Furthermore, the zoom lens is compact in structure for its image size and has an appropriately long back-focal distance. The zoom lens distributes light rays approximately parallel to and symmetrical with respect t to the optical axis X in a tangential plane on the master image side and has a high lens speed such as an F-number of 1.74 at the wide-angle end position. The fifth lens group G5 is configured such as to have its focal length within specified limits which is desirable when it is telecentric on the master image side. The zoom lens has a conjugate length of 79.56 mm.

Figures 4A, 4B:
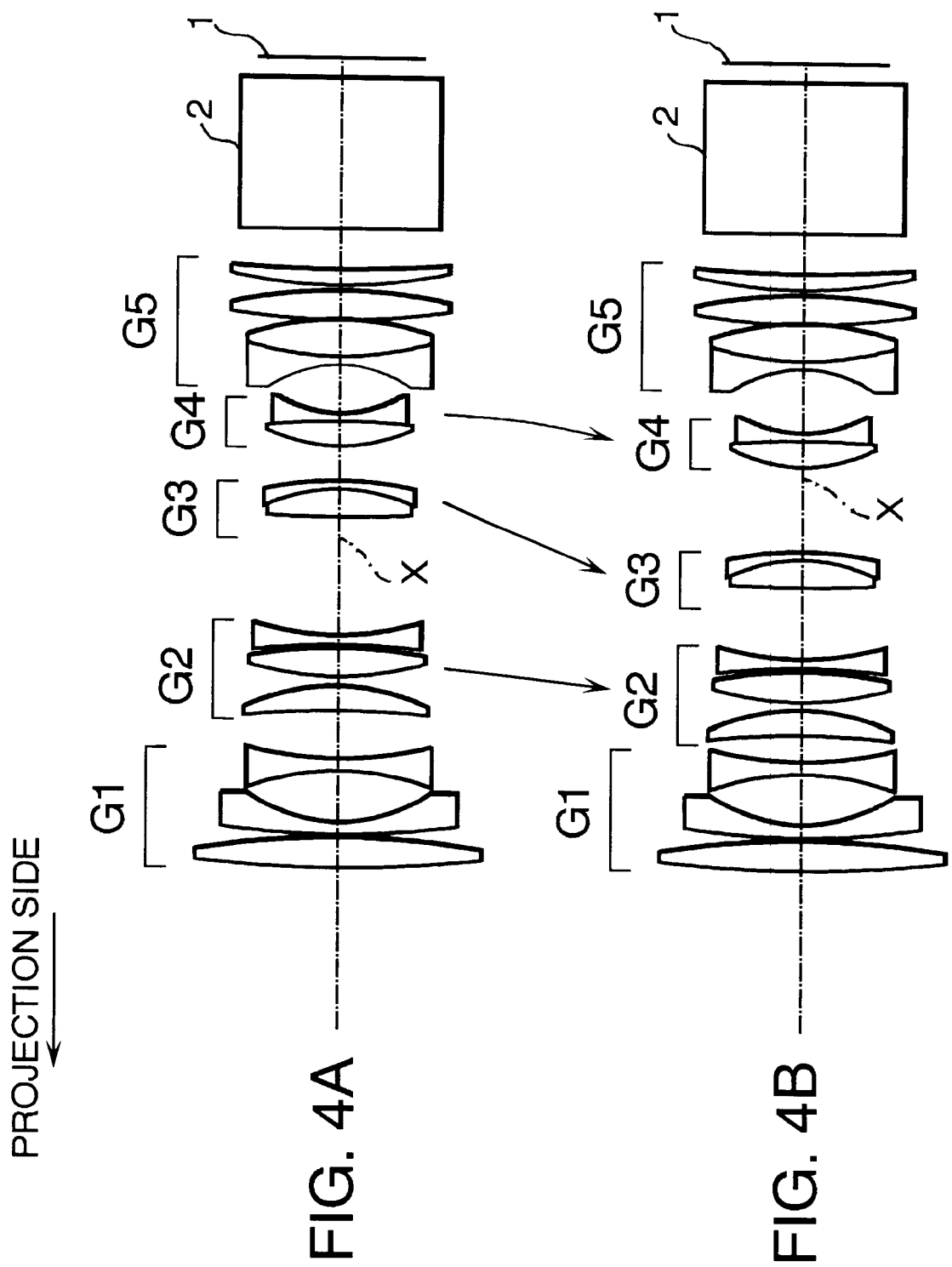
FIG. 4 illustrates schematic side elevations of a zoom lens according to a still another embodiment of the present invention which is in the wide-angle end position and in the telephoto end position, respectively.

A zoom lens used as a projection lens according to another embodiment of the present invention shown in FIGS. 4A and 4B includes five lens groups G1–G5, 14 lens elements L1–L14. Specifically, the zoom lens includes in order from the projected image side to the master image side a negative power first lens group G1 which comprises in order from the projected image side to the master image side a positive power bi-convex first lens element L1 having a stronger curvature at the projection side surface, a negative power meniscus second lens element L2 convex to the projected image side and a negative power bi-concave third lens element L3 having a stronger curvature at the projection side surface, a positive power second lens group G2 which comprises in order from the projected image side to the master image side a positive power meniscus fourth lens element L4 convex to the master image side, a positive power bi-convex fifth lens element L5 having a stronger curvature at the projection side surface and a negative power bi-concave sixth lens element L6 having the same curvature at opposite surfaces, a positive power third lens group G3 which comprises in order from the projected image side to the master image side a positive power bi-convex seventh lens element L7 having a stronger curvature at the master side surface and a negative power meniscus eighth lens element L8 convex to the master image side, a negative power fourth lens group G4 which comprises in order from the projected image side to the master image side a positive power bi-convex ninth lens element L9 having a stronger curvature at the projection side surface and a negative power bi-concave tenth lens element L10 having a stronger curvature at the master side surface, and a positive power fifth lens group G5 which comprises in order from the projected image side to the master image side a negative power bi-concave eleventh lens element L11 having a stronger curvature at the projection side surface, a positive power bi-convex twelfth lens element L12 having a stronger curvature at the master side surface, a positive power bi-convex thirteenth lens element L13 having a stronger curvature at the master side surface and a positive power plano-convex fourteenth lens element L14 convex to the projected image side. The seventh and eighth lens elements L7 and L8, the ninth and tenth lens elements L9 and L10 and the eleventh and twelfth lens elements L11 and L12 are cemented, respectively. The first lens group G1 is movable along the optical axis X during focusing and, however, stationary during varying the focal length of the entire lens. The three lens groups, G2, G3 and G4m are moved along the optical axis X relative to one another and relative to the stationary lens groups G1 and G5 to vary a magnification continuously and compensate a positional shift of an image plane 1 that is caused due to the variation of magnification. There is provided between the zoom lens and the image plane 1 an optical element assembly 2 including an infrared cut filter, a low-pass filter and a color and a color composing optical element or a color separation optical element.

The zoom lens shown in FIG. 4A and 4B is substantially described in Table III.

TABLE III

| Element | Radius of Curvature (mm) | Axial Distance Between Surfaces (mm) | Nd | νd |
|---|---|---|---|---|
| L1 | R1 = 2.9443 | D1 = 0.22448 | 1.51680 | 64.2 |

TABLE III-continued

| | | | | |
|---|---|---|---|---|
| | R2 = −5.2820 | | | |
| | | D2 = 0.0051 | | |
| | R3 = 3.9651 | | | |
| L2 | | D3 = 0.05913 | 1.58913 | 61.1 |
| | R4 = 0.8111 | | | |
| | | D4 = 0.36873 | | |
| | R5 = −1.0965 | | | |
| L3 | | D5 = 0.04730 | 1.54702 | 47.2 |
| | R6 = 2.1377 | | | |
| | | D6 (*) | | |
| | R7 = −11.7578 | | | |
| L4 | | D7 = 0.13973 | 1.71301 | 53.9 |
| | R8 = −1.5488 | | | |
| | | D8 = 0.05637 | | |
| | R9 = 1.5644 | | | |
| L5 | | D9 = 0.19334 | 1.83482 | 42.7 |
| | R10 = −3.0713 | | | |
| | | D10 = 0.01208 | | |
| | R11 = −2.4476 | | | |
| L6 | | D11 = 0.04533 | 1.51823 | 58.9 |
| | R12 = 2.4476 | | | |
| | | D12 = (*) | | |
| | R13 = 4.3519 | | | |
| L7 | | D3 = 0.13067 | 1.80401 | 46.6 |
| | R14 = −1.2464 | | | |
| L8 | | D14 = 0.03942 | 1.80519 | 25.4 |
| | R15 = −3.3133 | | | |
| | | D15 = (*) | | |
| | R16 = 1.3619 | | | |
| L9 | | D16 = 0.12298 | 1.78591 | 44.2 |
| | R17 = −2.4685 | | | |
| L10 | | D17 = 0.03350 | 1.64770 | 33.8 |
| | R8 = 0.8534 | | | |
| | | D18 = (*) | | |
| | R19 = −0.7258 | | | |
| L11 | | D19 = 0.04139 | 1.84667 | 23.9 |
| | R20 = 1.7011 | | | |
| L12 | | D20 = 0.25779 | 1.62041 | 60.3 |
| | R21 = −1.0055 | | | |
| | | D21 = 0.00591 | | |
| | R22 = 3.5664 | | | |
| L13 | | D22 = 0.18368 | 1.84667 | 23.9 |
| | R23 = −2.0647 | | | |
| | | D23 = 0.03666 | | |
| | R24 = 2.6127 | | | |
| L14 | | D24 = 0.10899 | 1.78591 | 44.2 |
| | R25 = ∞ | | | |
| | | D25 = 0.20000 | | |
| | R26= ∞ | | | |
| L15 | | D26 = 0.84353 | 1.51633 | 64.1 |
| | R27= ∞ | | | |

Zooming Space

| | D6 | D12 | D15 | D18 |
|---|---|---|---|---|
| Wide-angle End | 0.29580 | 0.71160 | 0.23395 | 0.23772 |
| Middle | 0.21731 | 0.57450 | 0.40291 | 0.28435 |
| Telephoto End | 0.15354 | 0.41114 | 0.52145 | 0.39293 |

Parameters

| F1/F | F2/F | F5/F | D2/F | δD2/(F × Ft)^½ | ν(−) |
|---|---|---|---|---|---|
| −0.93 | 1.24 | 1.54 | 0.71 | 0.27 | 25.4 |

As apparent from Table III, the zoom lens shown in FIGS. 4A and 4B satisfies the conditions (1) through (6).

Figure 8A:
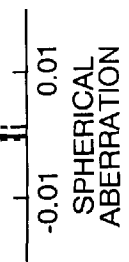

FIGS. 8A, 8B and 8C are diagrams showing curves of aberrations, namely spherical aberrations for d-, F- and C-spectral lines, astigmatism in the sagital plane and a tangential plane, distortion and the chromatic difference of magnification at the wide-angle end position, the middle position and the telephoto end position, respectively.

As apparent from Table III and the aberration diagrams shown in FIGS. 8A, 8B and 8C, the zoom lens shown in FIGS. 4A and 4B has the satisfactorily corrected aberrations as a whole over the range of zooming. Furthermore, the zoom lens is compact in structure for its image size and has an appropriately long back-focal distance. The zoom lens distributes light rays approximately parallel to and symmetrical with respect t to the optical axis X in a tangential plane on the master image side and has a high lens speed such as an F-number of 1.74 at the wide-angle end position. The fifth lens group G5 is configured such as to have its focal length within specified limits which is desirable when it is telecentric on the master image side. The zoom lens has a conjugate length of 79.66 mm.

Figures 5A, 5B:
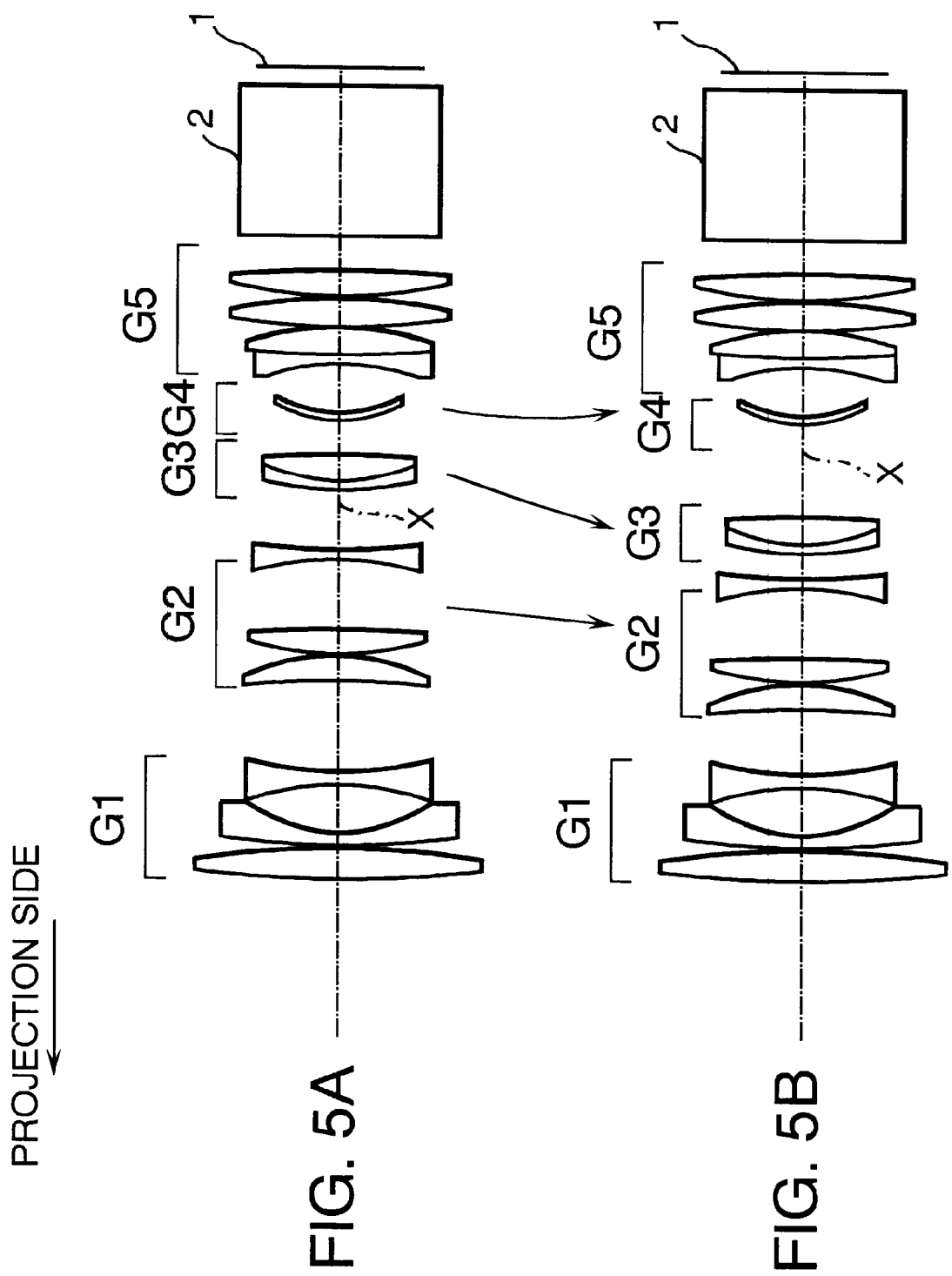
FIG. 5 illustrates schematic side elevations of a zoom lens according to a further embodiment of the present invention which is in the wide-angle end position and in the telephoto end position, respectively.

A zoom lens used as a projection lens according to another embodiment of the present invention shown in FIGS. 5A and 5B includes five lens groups G1–G5, 13 lens elements L1–L13. Specifically, the zoom lens includes in order from the projected image side to the master image side a negative power first lens group G1 which comprises in order from the projected image side to the master image side a positive power bi-convex first lens element L1 having a stronger curvature at the projection side surface, a negative power meniscus second lens element L2 convex to the projected image side and a negative power bi-concave third lens element L3 having a stronger curvature at the projection side surface, a positive power second lens group G2 which comprises in order from the projected image side to the master image side a positive power meniscus fourth lens element L4 convex to the master image side, a positive power bi-convex fifth lens element L5 having a stronger curvature at the projection side surface and a negative power bi-concave sixth lens element L6 having a stronger curvature at the master side surfaces, a positive power third lens group G3 which comprises in order from the projected image side to the master image side a negative power meniscus seventh lens element L7 convex to the projected image side and a positive power bi-convex eighth lens element L8 having a stronger curvature at the projection side surface, a negative power fourth lens group G4 which comprises a negative power meniscus ninth lens element L9 convex to the projected image side, and a positive power fifth lens group G5 which comprises in order from the projected image side to the master image side a negative power bi-concave tenth lens element L10 having a stronger curvature at the projection side surface, a positive power bi-convex eleventh lens element L11 having a stronger curvature at the master side surface, a positive power bi-convex twelfth lens element L12 having a stronger curvature at the master side surface and a positive power bi-convex thirteenth lens element L13 having a stronger curvature at the projection side surface. The seventh and eighth lens elements L7 and L8 and the tenth and eleventh lens elements L10 and L11 are cemented, respectively. The first lens group G1 is movable along the optical axis X during focusing an, however, stationary during varying the focal length of the entire lens. The three lens groups, G2, G3 and G4m are moved along the optical axis X relative to one another and relative to the stationary lens group G1 and G5 to vary a magnification continuously and compensate a positional shift of an image plane 1 that is caused due to the variation of magnification. There is provided between the zoom lens and the image plane 1 an optical element assembly 2 including an infrared cut filter, a low-pass filter and a color and a color composing optical element or a color separation optical element.

The zoom lens shown in FIG. 5A and 5B is substantially described in Table IV.

TABLE IV

| Element | Radius of Curvature (mm) | Axial Distance Between Surfaces (mm) | Nd | νd |
|---|---|---|---|---|
| L1 | R1 = 4.7305 | D1 = 0.14906 | 1.73688 | 54.3 |
|  | R2 = −15.2020 | D2 = 0.0589 |  |  |
| L2 | R3 = 3.0507 | D3 = 0.06676 | 1.51402 | 64.5 |
|  | R4 = 0.8960 | D4 = 0.34724 |  |  |
| L3 | R5 = −1.8474 | D5 = 0.05302 | 1.58352 | 39.6 |
|  | R6 = 1.8771 | D6 (*) |  |  |
| L4 | R7 = −16.5348 | D7 = 0.12174 | 1.76912 | 51.1 |
|  | R8 = −2.2377 | D8 = 0.02057 |  |  |
| L5 | R9 = 1.6307 | D9 = 0.17279 | 1.83496 | 38.3 |
|  | R10 = −10.8289 | D10 = 0.38110 |  |  |
| L6 | R11 = −2.1032 | D11 = 0.04909 | 1.49000 | 61.2 |
|  | R12 = 1.8833 | D12 = (*) |  |  |
| L7 | R13 = 4.1780 | D13 = 0.03927 | 1.83500 | 23.3 |
|  | R14 = 1.0455 |  |  |  |
| L8 | R15 = −2.1825 | D14 = 0.19288 | 1.82042 | 46.0 |
|  |  | D15 = (*) |  |  |
| L9 | R16 = 1.1186 | D16 = 0.03338 | 1.48998 | 56.9 |
|  | R17 = 0.8428 | D17 (*) |  |  |
|  | R18 = −0.7785 |  |  |  |
| L10 |  | D18 = 0.04123 | 1.83492 | 23.3 |
|  | R19 = 3.5123 |  |  |  |
| L11 |  | D19 = 0.23039 | 1.49989 | 65.0 |
|  | R20 = −0.9580 | D20 = 0.00596 |  |  |
| L12 | R21 = 66266 | D21 = 0.16494 | 1.83502 | 30.3 |
|  | R22 = −1.9000 | D22 = 0.00590 |  |  |
| L13 | R23 = 3.6286 | D23 = 0.12567 | 1.83501 | 44.4 |
|  | R24 = −5.1707 | D24 = 0.20000 |  |  |
| L14 | R25 = ∞ | D25 = 0.93858 | 1.51633 | 64.1 |
|  | R26 = ∞ |  |  |  |

Zooming Space

|  | D6 | D12 | D15 | D17 |
|---|---|---|---|---|
| Wide-angle End | 0.58994 | 0.31288 | 0.20874 | 0.27504 |
| Middle | 0.49784 | 0.23374 | 0.33990 | 0.31512 |
| Telephoto End | 0.41627 | 0.15451 | 0.52617 | 0.28965 |

Parameters

| F1/F | F2/F | F5/F | D2/F | δD2/(F × Ft)½ | ν(−) |
|---|---|---|---|---|---|
| −1.19 | 1.67 | 1.57 | 0.31 | 0.14 | 23.3 |

As apparent from Table IV, the zoom lens shown in FIGS. 5A and 5B satisfies the conditions (1) through (6).

Figure 9A:
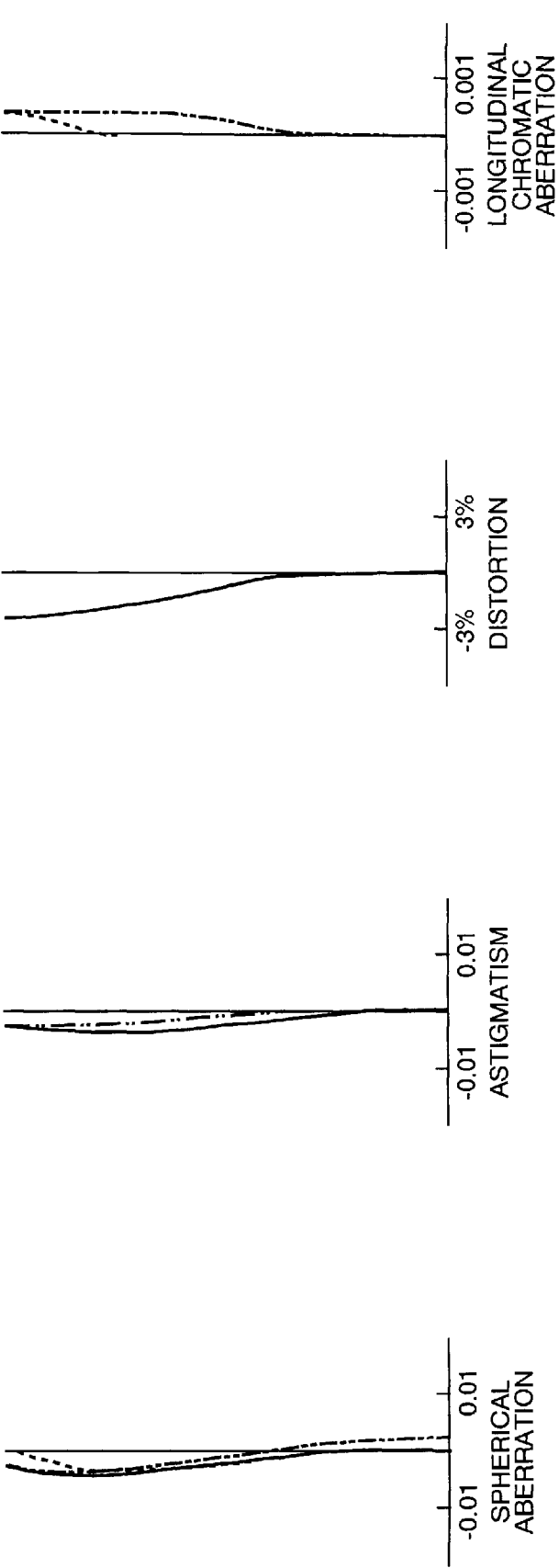

FIGS. 9A, 9B and 9C are diagrams showing curves of aberrations, namely spherical aberrations for d-, F- and C-spectral lines, astigmatism in the sagital plane and a tangential plane, distortion and the chromatic difference of magnification at the wide-angle end position, the middle position and the telephoto end position, respectively.

As apparent from Table IV and the aberration diagrams shown in FIGS. 9A, 9B and 9C, the zoom lens shown in FIGS. 5A and 5B has the satisfactorily corrected aberrations as a whole over the range of zooming. Furthermore, the zoom lens is compact in structure for its image size and has an appropriately long back-focal distance. The zoom lens distributes light rays approximately parallel to and symmetrical with respect t to the optical axis X in a tangential plane on the master image side and has a high lens speed such as an F-number of 1.74 at the wide-angle end position. The fifth lens group G5 is configured such as to have its focal length within specified limits which is desirable when it is telecentric on the master image side. The zoom lens has a conjugate length of 79.62 mm.

In the previous embodiments, each of the first to fifth lens groups G1–G5, the number of lens elements and the shape of lens element may be changed.

As described above, the zoom lens of the present invention comprises five lens groups G1–G5 including the positive power second lens group G2, the positive power third lens group G3 and the negative power fourth lens group G4 which are movable relative to one another and have focal lengths within specified limits, respectively, so that the zoom lens causes small changes in aberrations during zooming. Furthermore, the zoom lens is structured compact for its image size and has a back-focal distance appropriately long for installation of an optical element assembly including at lest a color composing optical element or a color separation optical element in a desired position. Because the fifth lens group G5, which is stationary during zooming, is structured so as to have a focal length within specified limits while the zoom lens is structured to balance corrections of the aberrations and a back-focal length, the lens group or groups on the projected image side are prevented from encountering an increase in diameter which is possibly caused due to the location of the focal point of the fifth lens group on the projected image side too close to the master image side even when the zoom lens is approximately telecentric on the master image side, which realizes overall compactness and inexpensiveness of the zoom lens. Further, because the second lens group comprise at least two positive power lens elements and is structured so as to shorten a distance relative to the third lens group as the zoom lens changes its focal length to the telephoto end, the aberrations of the zoom lens are satisfactorily corrected as a whole while achieving overall compactness and a high lens speed of the zoom lens.

It is to be understood that although the present invention has been described in detail with regard to preferred embodiments thereof, various other embodiments and variants may occur to those skilled in the art, which are within the scope and spirit of the invention, and such other embodiments and variants are intended to be covered by the following claims.

What is claimed is:

1. A zoom lens comprising in order from a large conjugate side to a small conjugate side a negative power first lens group movable in its entirety along an optical axis during focusing and, however, stationary during zooming, a positive power second lens group, a positive power third lens group, a negative power fourth lens group, and a stationary positive power fifth lens group, said second to said fourth lens groups being movable along an optical axis of the zoom lens in a given relationship relative to one another and relative to said first and fifth lens groups during zooming to continuously vary a magnification and compensate a shift of image plane, said zoom lens satisfying the following conditions:

$$-1.7 < F1/F < -0.3$$
$$0.7 < F2/F < 2.2$$
$$1.5 < F5/F < 2.2$$

where
F is the overall focal length of the zoom lens at a wide angle end;
F1 is the focal length of the first lens group;
F2 is the focal length of the second lens group;
F5 is the focal length of the fifth lens group; and
wherein the first and second lens group are arranged without any intervening lens element.

2. A zoom lens as defined in claim 1, wherein said zoom lens further satisfies the following conditions:

$$0.1 < D_2/F < 1.2$$
$$0.05 < \delta D_2/(F_x F_t)^{1/2} < 0.6$$

where
$D_2$ is the axial distance between the second and the third lens group at the wide-angle end;
$\delta D_2$ is an absolute value of a change in axial distance between the second and the third lens group between the wide-angle end and the telephoto end;
$F_t$ is the overall focal length of the zoom lens at the telephoto end.

3. A zoom lens as defined in claim 1, wherein said third lens group comprises a positive power lens element and a negative power lens element and satisfies the following condition:

$$\nu(-) < 35$$

where $\nu(-)$ is the Abbe number of the negative lens element of the third lens group.

4. A zoom lens comprising in order from a large conjugate side to a small conjugate side a negative power first lens group movable in its entirety along an optical axis during focusing and, however, stationary during zooming, a positive power second lens group, a positive power third lens group, a negative power fourth lens group, and a stationary positive power fifth lens group, said second to said fourth lens groups being movable along an optical axis of the zoom lens in a given relationship relative to one another and relative to said first and fifth lens groups during zooming to continuously vary a magnification and compensate a shift of image plane, said zoom lens satisfying the following conditions:

$$-1.7 < F1/F < -0.3$$
$$0.7 < F2/F < 2.2$$
$$1.5 \leq F5/F < 2.2$$

where
F is the overall focal length of the zoom lens at a wide angle end;
F1 is the focal length of the first lens group;
F2 is the focal length of the second lens group;
F5 is the focal length of the fifth lens group; and
wherein said second lens group comprises at least two positive power lens elements and moves so as to shorten an axial distance relative to said third lens group during zooming to a telephoto end.

5. A zoom lens as defined in claim 4, wherein said zoom lens further satisfies the following conditions:

$$0.1 < D_2/F < 1.2$$
$$0.05 < \delta D_2/(F_x F_t)^{1/2} < 0.6$$

where
$D_2$ is the axial distance between the second and the third lens group at the wide-angle end;
$\delta D_2$ is an absolute value of a change in axial distance between the second and the third lens group between the wide-angle end and the telephoto end;
$F_t$ is the overall focal length of the zoom lens at the telephoto end.

6. A zoom lens as defined in claim 4, wherein said third lens group comprises a positive power lens element and a negative power lens element and satisfies the following condition:

$$\nu(-) < 35$$

where $\nu(-)$ is the Abbe number of the negative lens element of the third lens group.

7. A zoom lens comprising in order from a large conjugate side to a small conjugate side a negative power first lens group movable along an optical axis of the zoom lens during focusing and, however, stationary during zooming, a positive power second lens group, a positive power third lens group at least including a positive power lens element and a negative power lens element, a negative power fourth lens group, and a stationary positive power fifth lens group, said second to said fourth lens groups being movable along the optical axis of the zoom lens in a given relationship relative to one another and relative to said first and fifth lens groups during zooming to continuously vary a magnification and compensate a shift of image plane, said zoom lens satisfying the following conditions:

$$-1.7 < F1/F < -0.3$$
$$0.7 < F2/F < 2.2$$
$$1.5 \leq F5/F < 2.2$$
$$0.1 < D2/F < 1.2$$
$$0.05 < \delta D2/(F_x F_t)^{1/2} < 0.6$$
$$\nu(-) < 35$$

where
F is the overall focal length of the zoom lens at a wide angle end;
F1 is the focal length of the first lens group;
F2 is the focal length of the second lens group;
F5 is the focal length of the fifth lens group;
D2 is the axial distance between the second and the third lens group at the wide-angle end;
$\delta$D2 is an absolute value of a change in axial distance between the second and the third lens group between the wide-angle end and the telephoto end;
Ft is the overall focal length of the zoom lens at the telephoto end;
$\nu(-)$ is the Abbe number of the negative lens element of the third lens group.

8. A zoom lens as identified in claim 7, wherein said second lens group comprises at least two positive power lens elements and moves so as to shorten an axial distance relative to said third lens group during zooming to a telephoto end.

* * * * *